United States Patent [19]

Falzoni

[11] 4,335,629

[45] Jun. 22, 1982

[54] DRIVE TRANSMISSION UNIT INCORPORATING EXPANSIBLE-PULLEY STEPLESS SPEED CHANGER

[75] Inventor: Gianluigi Falzoni, Turin, Italy

[73] Assignee: Fiat Auto S.p.A., Turin, Italy

[21] Appl. No.: 125,384

[22] Filed: Feb. 28, 1980

[30] Foreign Application Priority Data

Apr. 11, 1979 [IT] Italy ............................... 67766 A/79

[51] Int. Cl.³ ........................ F16H 37/00; F16H 37/08
[52] U.S. Cl. ...................................... 74/689; 74/695;
74/705; 74/760
[58] Field of Search ................. 74/701, 705, 695, 694,
74/682, 689, 760, 761, 710, 714

[56] References Cited

U.S. PATENT DOCUMENTS

| | | | |
|---|---|---|---|
| 3,090,256 | 5/1963 | Hause | 74/695 X |
| 3,375,738 | 4/1968 | Love | 74/740 |
| 3,411,382 | 11/1968 | Mori | 74/701 X |
| 3,492,890 | 2/1970 | Hill et al. | 74/714 |
| 3,577,805 | 5/1971 | Ohno et al. | 74/695 X |
| 3,939,732 | 2/1976 | Giacosa | 74/701 |
| 4,056,988 | 11/1977 | Kubo et al. | 74/695 |
| 4,060,012 | 11/1977 | Giacosa | 74/689 |
| 4,077,282 | 3/1978 | Kress | 74/760 |
| 4,138,837 | 2/1979 | Love | 74/740 X |
| 4,258,587 | 3/1981 | Morino | 74/695 X |

FOREIGN PATENT DOCUMENTS 1179687  5/1959  France .................................. 74/689
1297673 11/1972  United Kingdom .................. 74/695

Primary Examiner—Leslie Braun
Attorney, Agent, or Firm—Sughrue, Mion, Zinn, Macpeak & Seas

[57] ABSTRACT

A drive transmission unit for a motor vehicle incorporates an expansible-pulley stepless speed changer and a selectively-operable reversing unit. The speed changer has a primary shaft which serves as the input shaft of the transmission unit, and a secondary shaft parallel to, and driven from, the primary shaft. An output shaft of the transmission unit is positioned adjacent one end of the secondary shaft of the speed changer in coaxial alignment therewith and is operatively connected to the secondary shaft by the reversing unit. The reversing unit, which is of epicyclic form, is driven from said one end of the secondary shaft and can be set in one of three states in which respectively, the secondary and output shafts are arranged to rotate in the same sense, to rotate in opposite senses, and to be drivingly disengaged. The reversing unit is coaxial with the secondary and output shafts so that the overall transmission unit is very compact.

2 Claims, 2 Drawing Figures

DRIVE TRANSMISSION UNIT INCORPORATING EXPANSIBLE-PULLEY STEPLESS SPEED CHANGER

BACKGROUND OF THE INVENTION

1. Field of the Invention

The present invention relates to transmission units for transmitting drive from the engine of a motor vehicle to the half shafts of its driving wheels by means of an expansible-pulley stepless speed changer.

2. Description of the Prior Art

Vehicle drive transmission units are known which incorporate expansible-pulley stepless speed changers comprising parallel primary and secondary shafts each mounting a respective expansible pulley fast for rotation therewith. Each pulley is composed of two facing frusto-conical discs one of which is rigid with its mounting shaft and the other of which can be moved axially therealong. A trapezoidal belt passes around the two pulleys and serves to transmit drive therebetween. The radius of engagement of the belt with each pulley depends on the position of the slidable pulley disc axially of its mounting shaft. By suitable adjustment of the axial positions of the slidable pulley discs, the transmission ratio between the pulleys can be varied. Axial displacement of each slidable disc is controlled hydraulically by controlling the flow of hydraulic fluid into and out of a chamber juxtaposed the disc.

The secondary shaft is used to drive an output shaft of the transmission unit. This output shaft is normally directly connected to a differential unit used to drive the two half shafts of the vehicle's driving wheel.

Since the expansible-pulley speed changer does not itself provide the option of drive reversal, it is generally necessary to provide transmission units incorporating such speed changers with a selectively-operable reversing unit.

In the past, drive transmission units incorporating expansible-pulley speed changers and reversing units have been rather bulky. This feature represents an increasing drawback for this type of unit since, particularly in automobile engineering, there is a trend to smaller-sized vehicles.

Accordingly, it is an object of the present invention to provide a compact drive transmission unit which incorporates both an expansible-pulley stepless speed changer and a reversing unit.

SUMMARY OF THE INVENTION

In order to provide a compact transmission unit of the above-indicated form, the selectively-operable reversing unit required in such transmission units is, in accordance with the present invention, provided in the form of an epicyclic reversing unit coaxial with said secondary shaft and driven from one end thereof, the output shaft of the transmission unit being arranged adjacent the end of the secondary shaft driving the reversing unit and being connected to a rotatable output member of that unit. The reversing unit provides a reduction gear stage for the transmission as a whole and is remotely selectively settable into one of three states in which respectively, the second and output shafts are arranged to rotate in the same sense, to rotate in opposite senses, and to be drivingly disengaged.

Due to the above arrangement, all the component members of the transmission unit are arranged about two axes only, these axes being parallel to one another; as a result the unit is extremely compact.

BRIEF DESCRIPTION OF THE DRAWINGS

A motor-vehicle drive transmission unit embodying the invention will now be particularly described, by way of example, with reference to the accompanying diagrammatic drawing, in which.

DESCRIPTION OF THE PREFERRED EMBODIMENT

Figure 1:
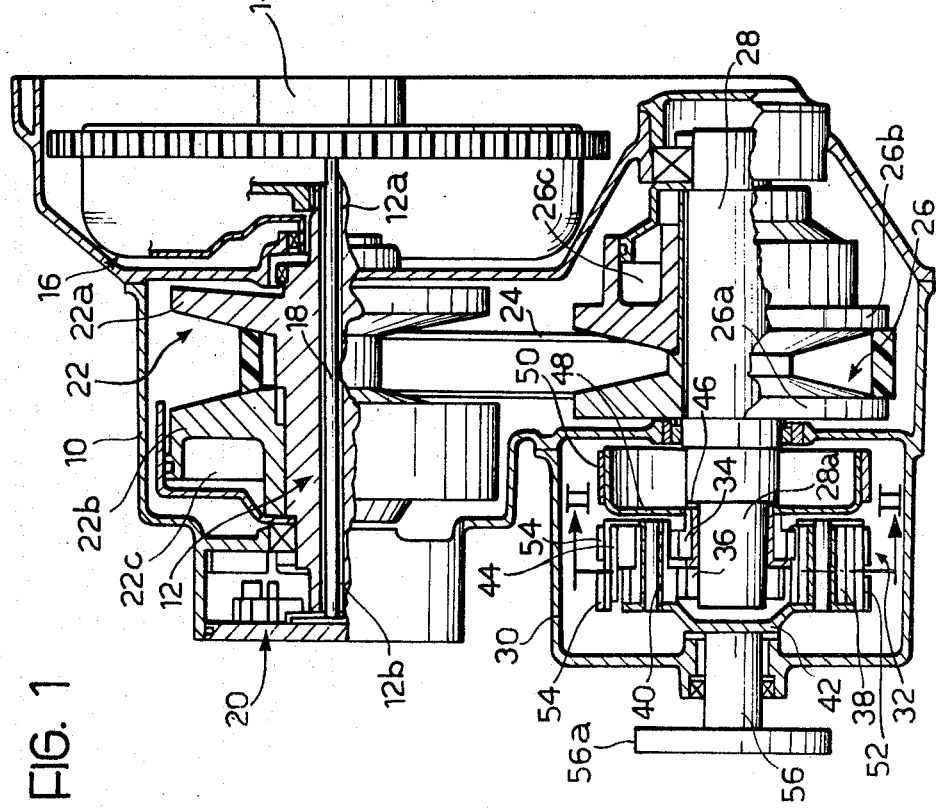
FIG. 1 is a part-sectional view of the transmission unit.

As shown in FIG. 1, the drive transmission unit comprises a fixed support structure 10 in the form of a casing within which parallel primary and secondary shafts 12 and 28 are rotatably mounted. One end 12a of the primary shaft 12 is connectable to a drive shaft 14 driven by the vehicle engine (not shown). The connection between the primary shaft 12 and the drive shaft 14 is effected by means of a fluid coupling 16, of type known per se, including a turbine to which the end 12a of the primary shaft 12 is connected.

The primary shaft 12 is hollow and internally rotatably mounts a driving shaft 18 connected at one end to the drive shaft 14. At its opposite end the shaft 18 is connected to drive a rotary, external-gear, hydraulic pump 20 which coaxially surrounds the end 12b of the primary shaft 12 remote from the drive shaft 14.

A driving pulley 22 is mounted on the primary shaft 12 fast for rotation therewith. The driving pulley 22 comprises two facing frusto-conical discs 22a, 22b. The disc 22a is rigidly connected to the primary shaft 12 while the disc 22 is slidable axially along the shaft 12.

A driven pulley 26 is mounted on the secondary shaft 28 fast for rotation therewith and, like the driving pulley 22, comprises two facing frusto-conical discs 26a, 26b one of which (the disc 26a) is rigidly connected to the secondary shaft 28 while the other (disc 26b) is slidable axially of the shaft 28.

The driving pulley 22 is arranged to transmit rotation of the primary shaft 12 to the driven pulley 26 (and hence to the secondary shaft 28) by means of a trapezoidal belt 24.

The axial displacement of the discs 22b and 26b of the driving and driven pulleys 22 and 26 respectively is achieved hydraulically in a manner known per se, by introducing oil under pressure into the interiors of chambers 22c, 26c respectively located adjacent the slidable discs 22b and 26b. The pressurised oil is supplied from an hydraulic circuit comprising the rotary pump 20 and a regulation device (not shown). By appropriate axial displacement of the discs 22b and 26b, it is possible to inversely vary the operative diameters of the pulleys 22 and 26 (in terms of their engagement with the belt 24) thereby varying the transmission ratio between the primary shaft 12 and the secondary shaft 28.

One end portion 28a of the secondary shaft 28 extends into the interior of a casing 30 arranged on one side of the support structure 10. The casing 30 houses a selectively-operable reversing unit 32 arranged coaxially with the secondary shaft 28. The unit 32 also provides a gear reduction stage for the overall transmission unit.

The reversing unit 32 is of the epicyclic type and includes a first and a second sun wheel 34, 36, two trios of planet wheels 38, 40, a planet carrier 42 rotatably mounting the planet wheels 38, 40, and an internally-toothed ring gear 44. The first sun wheel 34 is rotatably mounted by means of a bearing 46 on the end portion 28a of the secondary shaft 28. The end face of the sun wheel 34 nearest the pulley 26 is connected to a cylindrical bell 48 whose external cylindrical surface cooperates with a band brake 50 which is hydraulically controllable in a manner known per se. Application of the band brake 50 serves to secure the sun wheel 34 against rotation relative to the support structure 10. The second sun wheel 36 is positioned coaxially adjacent the first sun wheel 34 and is rigidly connected to the end 28a of the secondary shaft 28.

Figure 2:
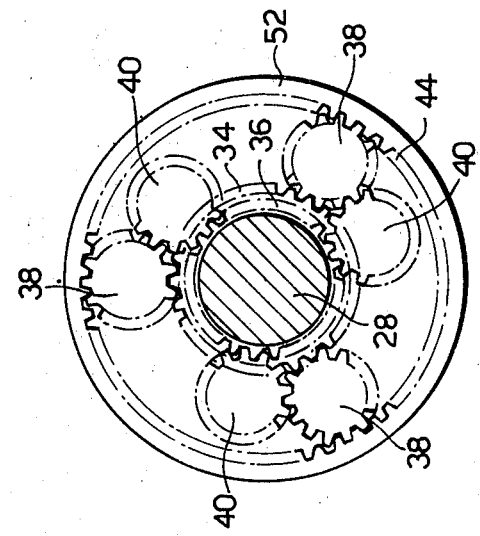
FIG. 2 is a section on line II—II of FIG. 1 to an enlarged scale.

As illustrated in FIG. 2, each planet wheel 38 of one planet-wheel trio meshes with a corresponding planet wheel 40 from the other trio to form three meshing pairs of planet wheels. In addition, the planet wheels 38 of one trio mesh with the first sun wheel 34 and with the ring gear 44, while the planet wheels 40 of the other trio mesh with the second sun wheel 36.

The internally-toothed ring gear 44 coaxially surrounds the secondary shaft 28 and is fixed to the inner surface of an annular support element 52 upon whose outer surface act a pair of band brakes 54 hydraulically controlled in a manner known per se. Application of the band brakes 54 serves to secure the ring gear 44 against rotation relative to the support structure 10.

The planet carrier 42 comprises a dished axle-mounting plate from one side of which project the planet-wheel axles, these axles extending parallel to the secondary shaft 28 and overlapping the end portion 28a of this shaft. On its side away from the shaft 28, the axle-mounting plate of the planet carrier 42 is rigidly secured to one end of a short output shaft 56 coaxially aligned with the secondary shaft 28. The output shaft 56 is rotatably mounted by the casing 30 and projects out of the casing. At its outer end, the shaft 56 has a radial flange 56a for the connection to a transmission shaft (not shown) which serves to drive via a differential gear system, known per se, the two half shafts of the driving wheels of the vehicle.

In operation of the drive transmission unit, the rotation of the drive shaft 14 is transmitted from the primary shaft 12 to the secondary shaft 28 by the trapezoidal belt 24 which passes around the pulleys 22 and 26. The rotation of the secondary shaft 28 is then transmitted to the epicyclic reversing-reduction gear unit 32. The unit 32 is selectively settable in one of three operating states by suitable control of the hydraulic control circuits of the belt brakes 50 and 54, these three operating states being a first state in which the output shaft 56 rotates in the same sense as the secondary shaft 28, a second state in which the output shaft 56 rotates in the opposite sense to the secondary shaft 28, and a third state in which the output shaft 56 is drivingly disengaged from the secondary shaft 28. The first operating state is set by application of the band brake 50 to lock the first sun wheel 34 (the band brakes 54 being released), the second state is set by application of the band brakes 54 to lock the ring gear 44 (the band brake 50 being released), and the third state is set by release of both the band brake 50 and the band brakes 54.

From the foregoing it will be appreciated that the described transmission unit is particularly compact and of small overall size, since all the component members are disposed about only two parallel axes corresponding to the axes of the expansible-pulley speed changer.

I claim:

1. In a motor vehicle, a drive transmission unit adapted to be operatively interposed between the vehicle's engine and a differential unit connected to the half shafts of the vehicle's driving wheels, said unit incorporating an expansible-pulley stepless speed changer and comprising:
    a support structure,
    a primary shaft rotatably mounted in said support structure and connectable at one end to the drive shaft from the engine of said vehicle,
    a secondary shaft rotatably mounted in said support structure parallel to said primary shaft,
    two expansible pulleys respectively mounted fast for rotation on said primary and secondary shafts, each pulley comprising two facing frusto-conical discs one of which is rigidly connected to its respective mounting shaft and the other of which is axially slidable therealong,
    a trapezoidal belt passing around said pulleys at respective radii of engagement dependent on the position of the said slidable disc of the corresponding pulley axially of its mounting shaft,
    hydraulic means operable to control the axial displacement of the said slidable disc of each pulley whereby to vary said radii of engagement and change the transmission ratio between said primary and secondary shafts, said hydraulic means including a mechanical pump arranged adjacent the end of the primary shaft remote from said drive shaft, said primary shaft being hollow and the transmission unit further including a pump-driving shaft connected at one end to the said drive shaft and extending through said primary shaft to drive said pump,
    an output shaft rotatably mounted by said support structure and adapted to drive said differential unit, said output shaft being arranged adjacent one end of the secondary shaft in coaxial alignment therewith, and
    an epicyclic reversing unit coaxial with said secondary shaft and driven from said one end thereof, the said reversing unit providing a reduction gear stage for the transmission unit and having a rotatable output member connected to said output shaft, the reversing unit being remotely selectively settable into one of three operating states in the first of which said output shaft is arranged to rotate in the same sense as said secondary shaft, in the second of which said output shaft is arranged to rotate in the opposite sense to said secondary shaft, and in the third of which said output shaft is drivingly disengaged from said secondary shaft.

2. A drive transmission unit according to claim 1, wherein said epicyclic reversing unit comprises:
    a first sun wheel rotatably mounted on said secondary shaft,
    a second sun wheel mounted on said secondary shaft adjacent the first sun wheel and fast for rotation with said secondary shaft,
    an internally-toothed ring gear coaxially surrounding the said first and second sun wheels,
    a planet carrier fast for rotation with the said output shaft and constituting the said rotatable output member,
    a first and a second trio of planet wheels rotatably mounted by said planet carrier with each planet wheel of the first trio meshing with a corresponding planet wheel of the second trio, the planet wheels of the first trio also meshing with said first sun wheel and with said ring gear, and the planet wheels of the second trio also meshing with said second sun wheel, remotely-controllable means selectively operable to secure said first sun wheel against rotation relative to said support structure, and remotely-controllable means selectively operable to secure said ring gear against rotation relative to said support structure.

* * * * *